(12) United States Patent
Pontano

(10) Patent No.: US 10,527,289 B2
(45) Date of Patent: Jan. 7, 2020

(54) PORTABLE GRILL

(71) Applicant: Industrial Revolution, Inc., Tukwila, WA (US)

(72) Inventor: Peter Pontano, Seattle, WA (US)

(73) Assignee: Industrial Revolution, Inc., Tukwila, WA (US)

(*) Notice: Subject to any disclaimer, the term of this patent is extended or adjusted under 35 U.S.C. 154(b) by 334 days.

(21) Appl. No.: 15/324,657

(22) PCT Filed: Jul. 7, 2015

(86) PCT No.: PCT/US2015/039448
§ 371 (c)(1),
(2) Date: Jan. 6, 2017

(87) PCT Pub. No.: WO2016/007558
PCT Pub. Date: Jan. 14, 2016

(65) Prior Publication Data
US 2017/0205074 A1   Jul. 20, 2017

Related U.S. Application Data

(60) Provisional application No. 62/021,642, filed on Jul. 7, 2014.

(51) Int. Cl.
*F24C 1/16* (2006.01)
*A47J 37/07* (2006.01)

(52) U.S. Cl.
CPC ............. *F24C 1/16* (2013.01); *A47J 37/0772* (2013.01); *A47J 2037/0777* (2013.01); *A47J 2037/0795* (2013.01)

(58) Field of Classification Search
CPC .......... A47B 2220/09; F24C 1/16; F24C 3/14; F24B 1/205; A47J 37/0763; A47J 33/00; A47J 37/07
See application file for complete search history.

(56) References Cited

U.S. PATENT DOCUMENTS 2,550,793 A * 5/1951 Ferriera ................... G10G 5/00
                                                    248/163.1
2,697,574 A * 12/1954 Bricker ..................... A47B 3/12
                                                    248/149

(Continued)

FOREIGN PATENT DOCUMENTS

DE            10332134       4/2006

*Primary Examiner* — Jorge A Pereiro
(74) *Attorney, Agent, or Firm* — DWC Law Firm, P.S.; David Chen

(57) ABSTRACT

A portable grill and method of using the same. The portable grill can be stowed in a fully compact state with grill bars, leg members, and tension bars stored within an elongated container formed by frame members of the portable grill. Removable end caps can be snugly attached to end portions of the container to seal the container and help retain the frame member together, the end caps being formed of flexible heat resistant material, and usable as heat mitts. When in a fully assembled state, the grill bars of the portable grill are placed under tension by use of tension bars that are configured to be shorter than the grill bars, and which can retain the frame members at a parallel distance from one another that is less than the length of the grill bars.

15 Claims, 13 Drawing Sheets

(56) References Cited

U.S. PATENT DOCUMENTS

| | | | | |
|---|---|---|---|---|
| 2,794,496 A * | 6/1957 | Strand, Jr. | | A47C 4/02 |
| | | | | 126/304 R |
| 2,917,039 A * | 12/1959 | Sheedlo | | A47J 37/0763 |
| | | | | 126/306 |
| 3,013,670 A * | 12/1961 | Mayer | | A47B 3/12 |
| | | | | 108/181 |
| 3,369,720 A * | 2/1968 | Libit | | B65D 45/02 |
| | | | | 222/517 |
| 3,461,634 A | 8/1969 | Earl | | |
| 3,523,508 A | 8/1970 | Maslow | | |
| 3,537,388 A * | 11/1970 | Martin | | A47J 37/0763 |
| | | | | 126/274 |
| 3,636,938 A | 1/1972 | Faltersack | | |
| 3,785,360 A * | 1/1974 | Martin | | A47J 37/0763 |
| | | | | 126/30 |
| 3,904,062 A * | 9/1975 | Grussen | | B65D 41/3447 |
| | | | | 215/252 |
| 3,905,286 A * | 9/1975 | Le Grady | | A47J 37/0763 |
| | | | | 126/25 R |
| 4,024,851 A | 5/1977 | Boda | | |
| 4,109,567 A * | 8/1978 | Gage | | A47J 33/00 |
| | | | | 108/147.13 |
| 4,354,437 A * | 10/1982 | Logan | | A47B 3/00 |
| | | | | 108/128 |
| 4,393,857 A | 7/1983 | Sanford | | |
| 4,582,041 A * | 4/1986 | Erickson | | A47J 37/0704 |
| | | | | 126/25 R |
| 4,728,066 A * | 3/1988 | Lang | | F16M 11/046 |
| | | | | 182/182.1 |
| 4,796,599 A * | 1/1989 | Cooper | | A47J 33/00 |
| | | | | 126/25 A |
| 4,836,480 A * | 6/1989 | Besner | | A47J 37/0763 |
| | | | | 126/25 A |
| 4,915,268 A * | 4/1990 | Lay | | B65D 47/0809 |
| | | | | 220/835 |
| 5,038,749 A * | 8/1991 | Jerry | | F24C 3/14 |
| | | | | 126/38 |
| 5,165,384 A * | 11/1992 | Knutson | | A47B 37/04 |
| | | | | 126/201 |
| 5,406,931 A * | 4/1995 | Montgomery | | A47J 33/00 |
| | | | | 126/29 |
| 5,785,193 A * | 7/1998 | Kobayashi | | B65D 47/0814 |
| | | | | 16/227 |
| 6,205,912 B1 * | 3/2001 | Chiu | | A47J 37/0704 |
| | | | | 126/25 R |
| 6,357,434 B1 * | 3/2002 | Bossler | | A47J 37/0704 |
| | | | | 126/154 |
| D464,262 S * | 10/2002 | Drennow | | D9/446 |
| 6,546,851 B1 * | 4/2003 | Osborne | | A47J 37/0763 |
| | | | | 126/30 |
| 7,568,942 B1 * | 8/2009 | Lannon | | H01R 13/5213 |
| | | | | 439/136 |
| D676,318 S * | 2/2013 | MacNeill | | D9/446 |
| D741,650 S * | 10/2015 | Bombard | | D7/409 |
| D776,533 S * | 1/2017 | Kikel | | D9/446 |
| 9,730,553 B2 * | 8/2017 | Bombard | | A47J 37/0694 |
| D809,060 S * | 1/2018 | Zhang | | D19/194 |
| D839,730 S * | 2/2019 | Wang | | D9/446 |
| 2005/0011510 A1 * | 1/2005 | Lee | | A47J 37/0694 |
| | | | | 126/25 R |
| 2005/0108802 A1 | 5/2005 | Burnett et al. | | |
| 2005/0229794 A1 * | 10/2005 | Lin | | A47J 37/0704 |
| | | | | 99/499 |
| 2006/0150963 A1 * | 7/2006 | Barron | | A47J 33/00 |
| | | | | 126/9 R |
| 2007/0095336 A1 * | 5/2007 | Pfuller | | A47J 33/00 |
| | | | | 126/9 R |
| 2007/0170193 A1 * | 7/2007 | Schorner | | B65D 51/26 |
| | | | | 220/839 |
| 2009/0255933 A1 * | 10/2009 | Zeyfang | | B65D 55/16 |
| | | | | 220/375 |
| 2010/0044390 A1 * | 2/2010 | Tanaka | | B01L 3/50825 |
| | | | | 220/837 |
| 2010/0230404 A1 * | 9/2010 | Sigler | | A47J 37/0772 |
| | | | | 219/732 |
| 2011/0073723 A1 * | 3/2011 | Ashpole | | A47C 4/20 |
| | | | | 248/176.2 |
| 2011/0113974 A1 * | 5/2011 | D'Amato | | A47J 37/0786 |
| | | | | 99/426 |
| 2012/0003030 A1 * | 1/2012 | Kish | | B43K 23/12 |
| | | | | 401/202 |
| 2012/0247607 A1 * | 10/2012 | MacNeill | | F16L 55/115 |
| | | | | 138/96 R |
| 2013/0081607 A1 * | 4/2013 | Weyandt | | A47J 33/00 |
| | | | | 126/29 |
| 2013/0146044 A1 * | 6/2013 | Ahmed | | A47J 37/0786 |
| | | | | 126/153 |
| 2014/0061208 A1 * | 3/2014 | Boyd | | A47J 41/0005 |
| | | | | 220/592.17 |
| 2014/0230666 A1 * | 8/2014 | Atlaw | | A47J 37/0786 |
| | | | | 99/449 |

* cited by examiner

PORTABLE GRILL

CROSS REFERENCE TO RELATED APPLICATION(S)

This application is the US national phase entry of International Patent Application No. PCT/US2015/039448, filed Jul. 7, 2015, which claims priority to U.S. Provisional Patent Application No. 62/021,642, filed Jul. 7, 2014, both of which are incorporated herein by reference in their entireties.

BACKGROUND

1. Technical Field

The present invention relates to portable grills, and in particular, to portable grills that can be stowed using frame members of the grills as containers, and which can be stabilized during use in a fully assembled state by placing grill bars under tension.

2. Description of Related Art

U.S. Pat. No. 6,546,851 discloses a portable cooking grill having a pair of linear side retaining members, each having a horizontal and a vertical borehole at both ends and each having a plurality of sockets regularly spaced apart along one side of each side retaining member. The ends of a plurality of transverse rods can be registered within opposing sockets and the assembly is secured in place with clamping rods with threaded fasteners, forming a rigid grilling surface. The entire assembly may be disassembled and the components may be stored and transported in a tube or similar container.

US Pat. App. Pub. No. US 20070095336 discloses a take-apart picnic grill that includes two hollow profiles to be disposed parallel to each during assembly and connected by a plurality of rods to form a grilling surface. Threaded fasteners are also used to hold the assembly together during use. The hollow profiles are tubes, the diameter of one of which is sufficiently larger than the other to allow the tube with the smaller diameter to be inserted inside the tube with the larger diameter for transport purposes. In addition, all other components of the grill can be stored within the tubes for transportation.

BRIEF SUMMARY

In some embodiments, a portable grill assembly comprises a plurality of elongated leg members; a plurality of flexible elongated grill bars; and at least a pair of elongated frame members, each having a trough-like configuration, with each frame member having a plurality of longitudinally spaced apart receiving holes for receiving tip portions of the grill bars. Also, at least one elongated tension bar is provided having an attachment member on each opposite end thereof, a distance between the opposite attachment members on the tension bar being configured to impart a tension on the grill bars when opposite tip portions of the grill bars are inserted into the receiving holes when the portable grill assembly is placed in a fully assembled state.

In some embodiments, in a fully assembled state, the portable grill comprises at least a pair of frame members; a plurality of flexible grill bars removably attached to the frame members under a tensioned state with a spring characteristic of the grill bars imposing a force on the frame members; and with a plurality of leg members removably attached to the frame members. Also, at least one tension bar is attached to at least two of the leg members, wherein a force imposed by the grill bars in the tensioned state acts on the tension bar through the frame members and through the two leg members to which the tension bar is attached, to impose a stretching force on the at least one tension bar.

In some embodiments, a method of assembling and using a portable grill is provided, not necessarily limited to the order presented herein. For example, the method can comprise attaching a first end of a tension bar to a first leg member; attaching a second end of the tension bar to a second leg member; inserting a portion of the first leg member through an aperture in a first frame member; inserting a portion of the second leg member through an aperture in a second frame member; attaching a plurality of grill bars to the frame members under tension by bending the grill bars and attaching tip portions thereof to the frame members; allowing a spring characteristic of the bent grill bars to impose a force on the tension bar, the force being imposed on the frame members, and in turn, communicated to the leg members, and in turn, communicated to the tension bar; and grilling a first food item on the grill bars under tension.

In some embodiments, a portable grill assembly comprises a container for storing components of a portable grill and an end cap for the container. An end portion of the container is snugly fit within a chamber of the end cap, and the end cap is formed of flexible heat resistant material. The container can be defined by frame members of the portable grill assembly used to retain grill bars. Also, the end cap can have a pass-through section with two openings through which the end portion of the container can pass, and the end cap can have an end section connected to the pass-through section by a bridge portion. The bridge portion extends less than a full perimeter around the end cap to expose an entrance opening on the end section, the end section also having a closed end wall opposite the entrance opening.

BRIEF DESCRIPTION OF THE DRAWINGS

FIG. 8 is a perspective view of the container of FIG. 7a.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

Figure 1:
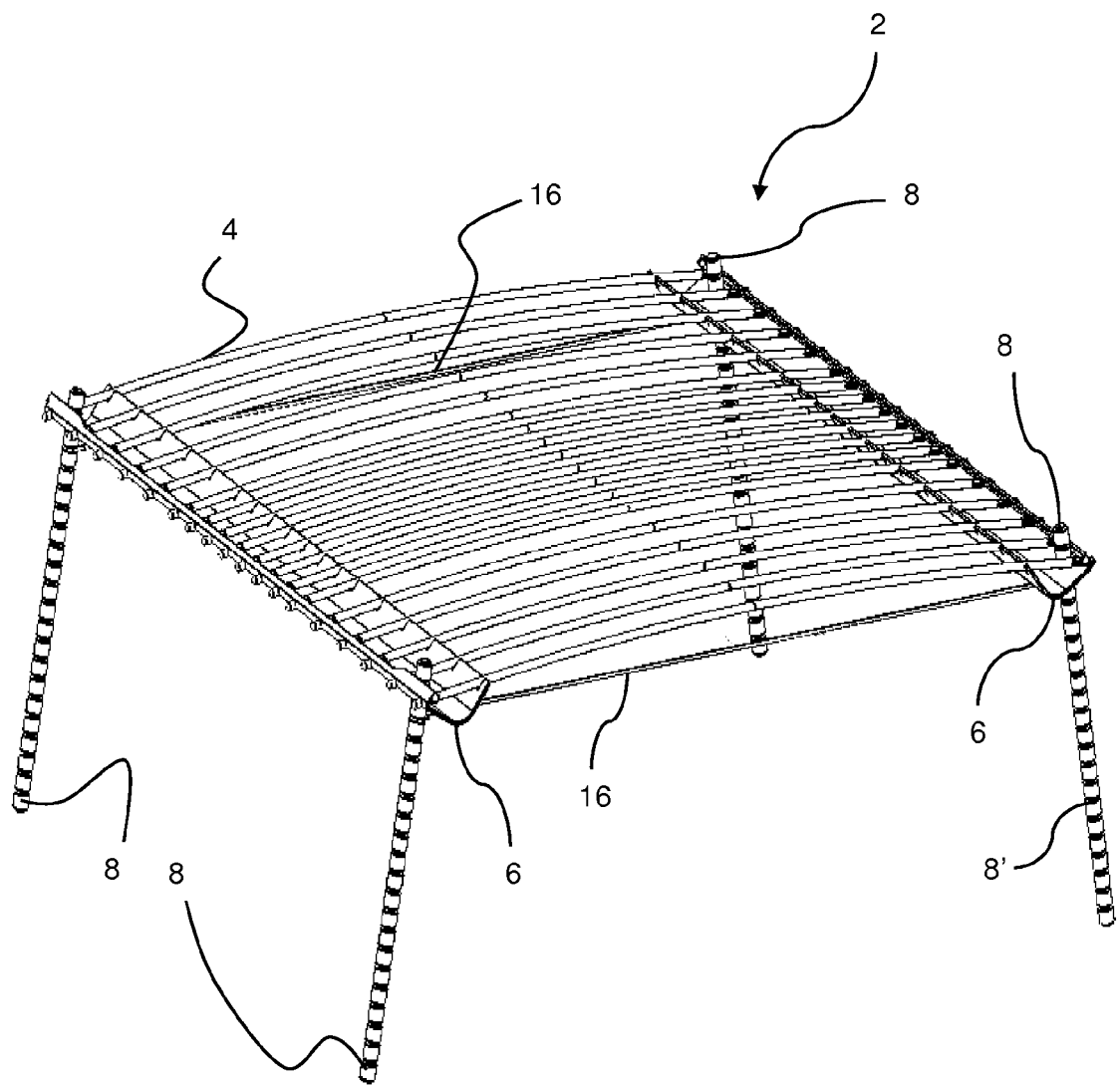
FIG. 1 is a perspective view of a portable grill for some embodiments of the present disclosure, the portable grill being shown in a fully assembled state under tension imparted by the bent grill bars and counter-acting tension bars.
Figure 9:
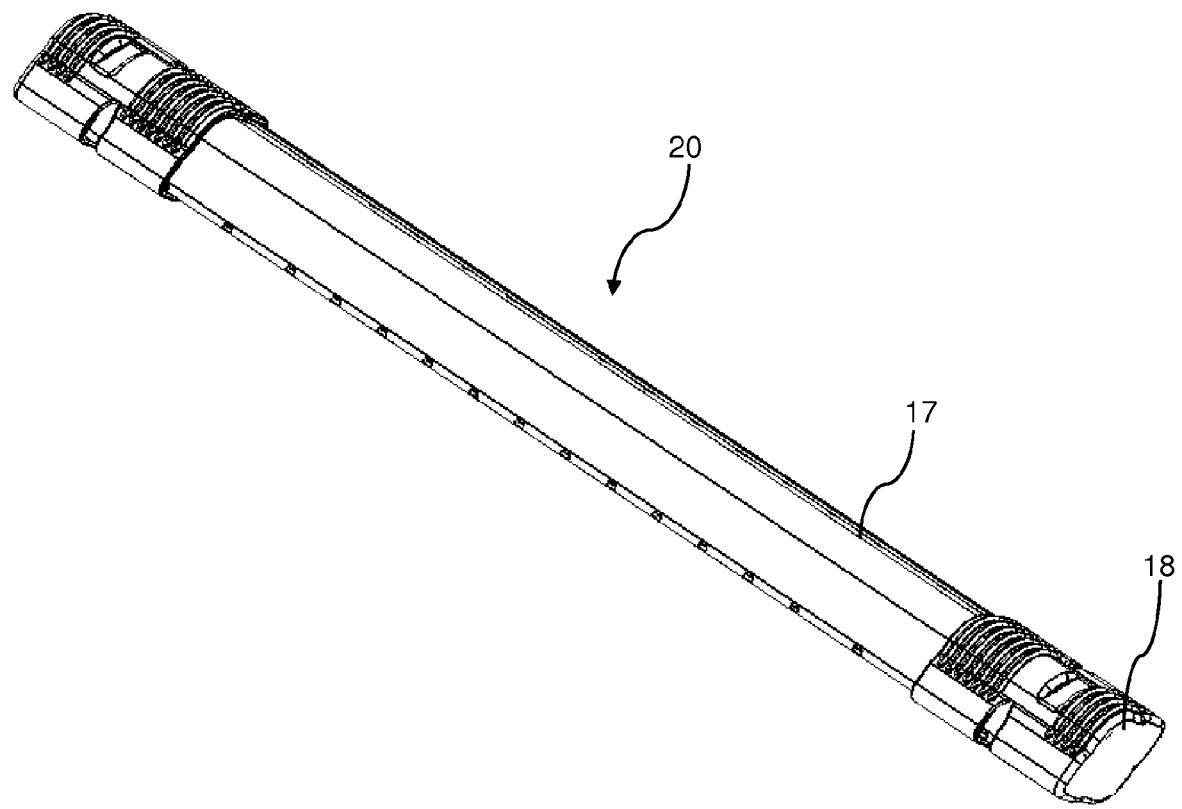
FIG. 9 is a perspective view of the portable grill of FIG. 1 in a fully stowed state, having end caps attached to end portions of the container, for some embodiments of the present disclosure.

In some embodiments of the present disclosure, a portable grill 2 in a fully assembled state is provided, such as shown in FIG. 1, comprising a pair of frame members 6 disposed in parallel alignment and supported by removable leg members 8. A plurality of removable grill bars 4 extend between the opposed frame members 6, with end portions of the grill bars 4 retained on the frame members 6. At least a pair of tension bars 16 having hooked end portions are connected to and pull opposite leg members 8 toward one another against an opposing force of the grill bars 4 tending to push the leg members 8 apart, the grill bars 4 being under tension by having spring characteristic and being bent from a resting straight/linear configuration, with an outward force of the grill bars 4 being communicated to the leg members 8 through the frame members 6. The portable grill 2 can be stowed in a fully compact state, such as shown in FIG. 9, from which compact state it can be quickly assembled to the fully assembled state shown in FIG. 1.

In some embodiments, in the fully assembled state shown in FIG. 1, the portable grill 2 has unique structural strength attributes with only the components illustrated, without a need for threaded or other fasteners and/or associated components (e.g., wing nuts, etc.), due in part, to the opposing tension of the compressed elongated grill bars 4 that push frame members 6 apart against the opposing force being applied on the leg members 8 via retention by the tension bars 16.

Relative to FIG. 1, in some embodiments, each of the pair of frame members 6 has an elongated trough-like configuration, with a longitudinal axis of each frame member 6 being aligned in parallel to a longitudinal axis of the other frame member 6, when the portable grill 2 is in the fully assembled state, and with the longitudinal axes of the frame members 6 disposed in perpendicular fashion relative to each of the plurality of grill bars 4.

Figure 2:
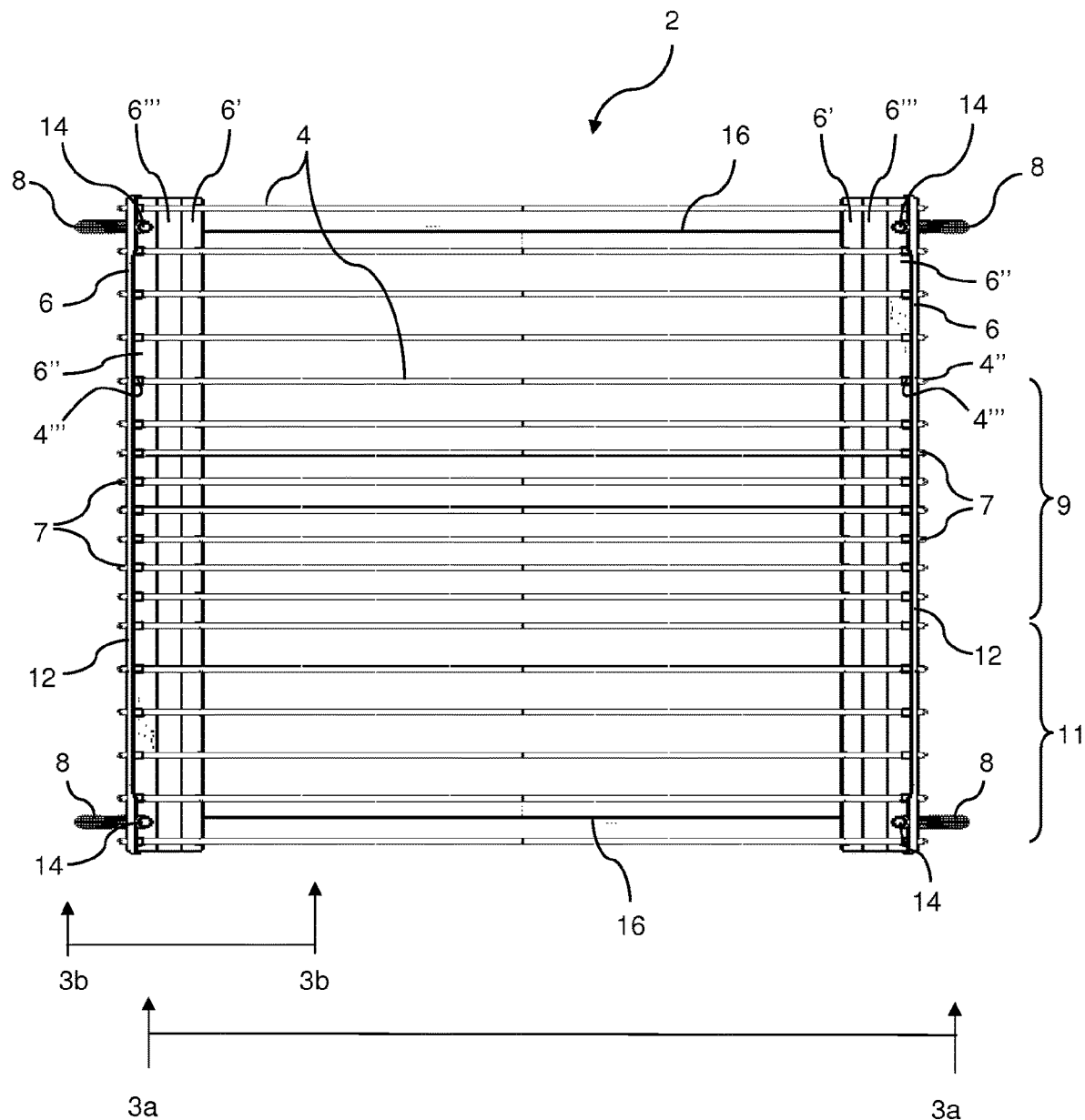
FIG. 2 is an overhead plan view of the portable grill of FIG. 1.
Figure 3A:
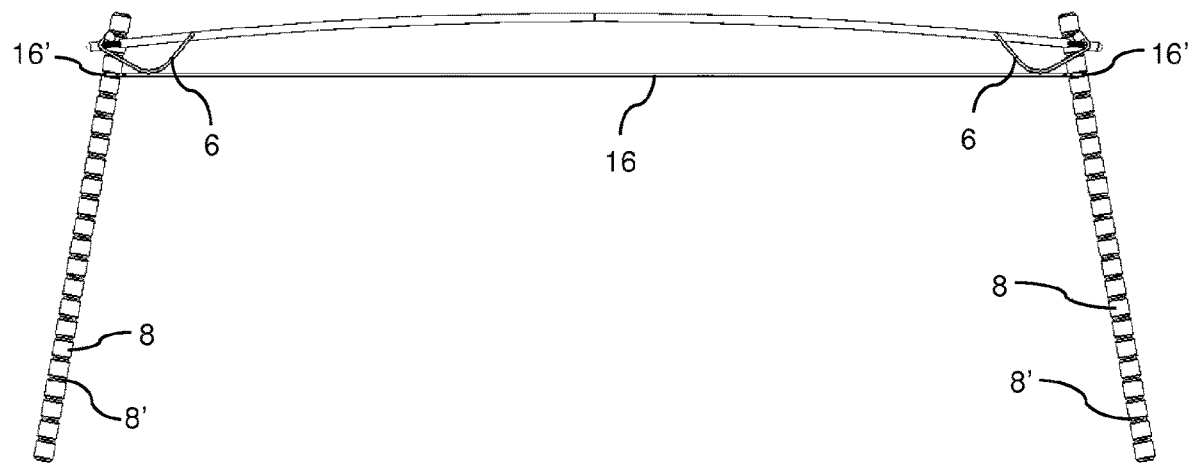
FIG. 3a is a front elevation view of the portable grill of FIG. 1.
Figure 3B:
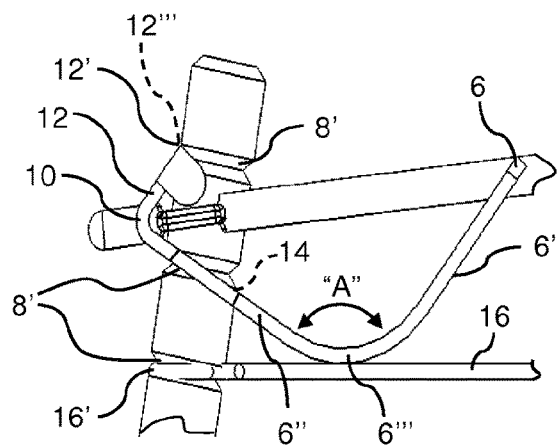
FIG. 3b is detail partial front elevation view along line 3b-3b of FIG. 2.

Referring to FIGS. 2, 3a & 3b, each trough-like frame member 6 can comprise two opposite longitudinally extending sidewalls 6', 6" extending longitudinally along the entire length of the frame members 6, with each sidewall 6', 6" being sloped outwardly upward (in opposite lateral directions) from a laterally curved elongated central portion 6''', which also extends along the entire longitudinal length of each frame member 6. In some embodiments, the laterally curved elongated central portion 6''' can having a consistent lateral radius of curvature throughout the length of the frame member 6, with the two longitudinally extending sidewalls 6', 6" being generally planar. In other embodiments, the trough-like structure of the frame members can be provided with other cross-sectional shapes, such as, for example, a semi-circular shape, or the sidewalls 6', 6" can be laterally curved rather than planar, or the central portion 6''' can be planar/flat, etc., as will be appreciated by those skilled in the art after reviewing this disclosure.

In some embodiments, a lateral cross sectional angle "A" (See, e.g., FIG. 3b) between planar surfaces of the longitudinally extending sidewalls 6', 6" of each frame member 6 is greater than 90 degrees, but less than 180 degrees, or between about 100 to about 130 degrees, or equal to or less than 90 degrees.

Also, as best seen in FIGS. 2 and 3b, each outside sidewall 6" of the frame members 6 can be integrally formed at its upper portion with a laterally inwardly curving flange base 10, which in turn, can be integrally formed with a flange 12 disposed above the flange base 10, the flange 12 extending laterally inwardly toward the central portion 6''' and sloping inwardly upward (inwardly toward a central portion of the portable grill 2).

In some embodiments, each of the frame members 6, including the longitudinally extending sidewalls, 6', 6", longitudinally extending curved central portion 6''', longitudinally extending flange base 10, and longitudinally extending flange 12 are integrally formed, and the material of construction can be, for example, stainless steel.

Figure 5:
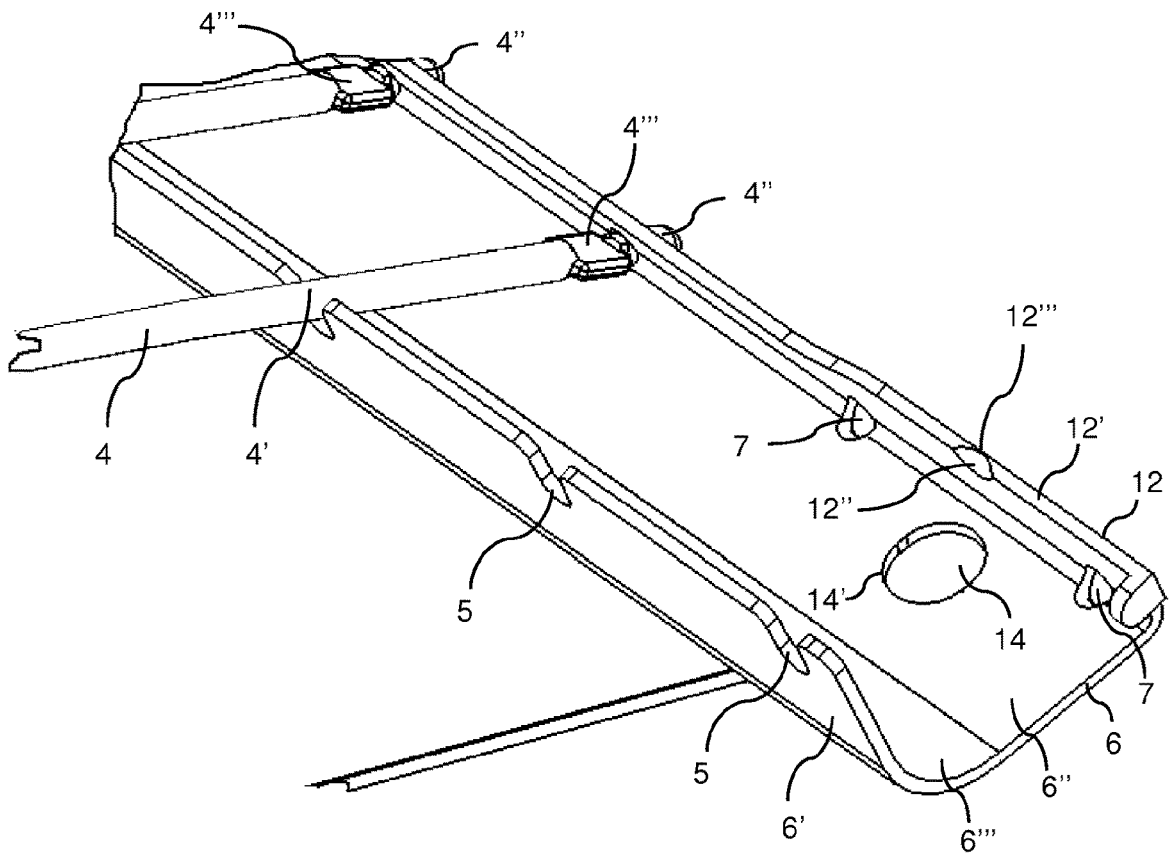
FIG. 5 is a partial perspective view of a front right portion of the portable grill of FIG. 1, with a leg member and two forwardmost grill bars removed to fully reveal a support aperture for the leg member, and notch(es) and receiving hole(s) for the removed grill bar(s).

Referring to FIGS. 2 and 5, in some embodiments, each of the frame members 6 has two leg support apertures 14 formed thereon, one disposed near each end portion thereof, through which respective leg members 8 can be partially inserted. The support apertures 14 are formed on the outside sidewalls 6" of the frame members 6 in some embodiments.

Figure 6A:
FIG. 6a is a side elevation view of a tension bar for some embodiments of the present disclosure.
Figure 6B:
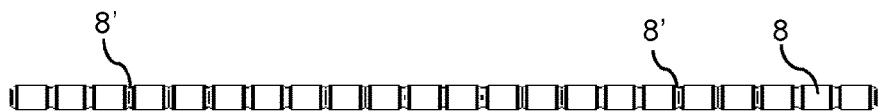
FIG. 6b is a side elevation view of a leg member, disposed horizontally, for some embodiments of the present disclosure.

Referring to FIGS. 1 and 6b, in some embodiments, four leg members 8 are provided, each being elongated members having a plurality of circumferential grooves 8' disposed successively along a length of the leg members 8 in evenly spaced-apart fashion. In some embodiments, the leg members 8 are cylindrically shaped, or tubular, and can have a hollow interior chamber.

Referring to FIGS. 3b & 5, in the fully assembled state of the portable grill 2, in some embodiments, the leg members 8 are each partially inserted through a support aperture 14, with each leg member 8 resting against an internal edge wall 14' of its corresponding support aperture 14 through which the leg member 8 is partially inserted, and with a circumferential groove 8' of the same leg member 8 resting against an upper edge 12' of the flange 12 of the frame member 6. As best seen in FIG. 5, in some embodiments, an indent, or concave groove 12'', is provided on a laterally inward section of the upper edge 12' of the flange 12, in longitudinal alignment with the support aperture 14, against which a sidewall of the corresponding leg member 8, within one of the grooves 8', can seat. In some embodiments, this concave groove 12'' can provide a thin upper edge section 12''' of the flange member 12, which can be thinner than other portions of the upper edge 12', such that this thin upper edge section 12''' can easily fit into and rest within a selected groove 8', to retain the corresponding leg member 8' at a selected height corresponding to the selected groove 8', when the leg member 8 is tensioned laterally against the groove 8', as will be appreciated by those skilled in the art after reviewing this disclosure. In some embodiments, a corresponding concave groove 12'' and thin upper edge section 12''' is provided in longitudinal alignment with each support aperture 14 on the frame members 6.

Still referring to FIG. 3b, in some embodiments, the thin upper edge section 12''' of the flange 12 can be situated sufficiently laterally inward toward the central portion 6''' of the frame member 6, such that the leg member 8 extending upwardly through support aperture 14 (which is formed on the outside sidewall 6'') must be disposed in an upward inwardly sloped fashion in order to extend upward past, or other clear, the thin upper edge section 12''' of the flange 12. In this manner, when the portable grill 2 is in the fully assembled state, the leg members 8 can be retained in upward inwardly sloped fashion with bottom portions of the legs 8 flared out laterally past the outer edges of the frame members 6. In some embodiments, the slope of the leg members 8 in the fully assembled state imparts an angle from a vertical axis (relative to FIG. 3a) of about 3 degrees to about 8 degrees. In other embodiments, this angle from vertical axis can be less than about 3 degrees, or greater than about 8 degrees.

Figure 4:
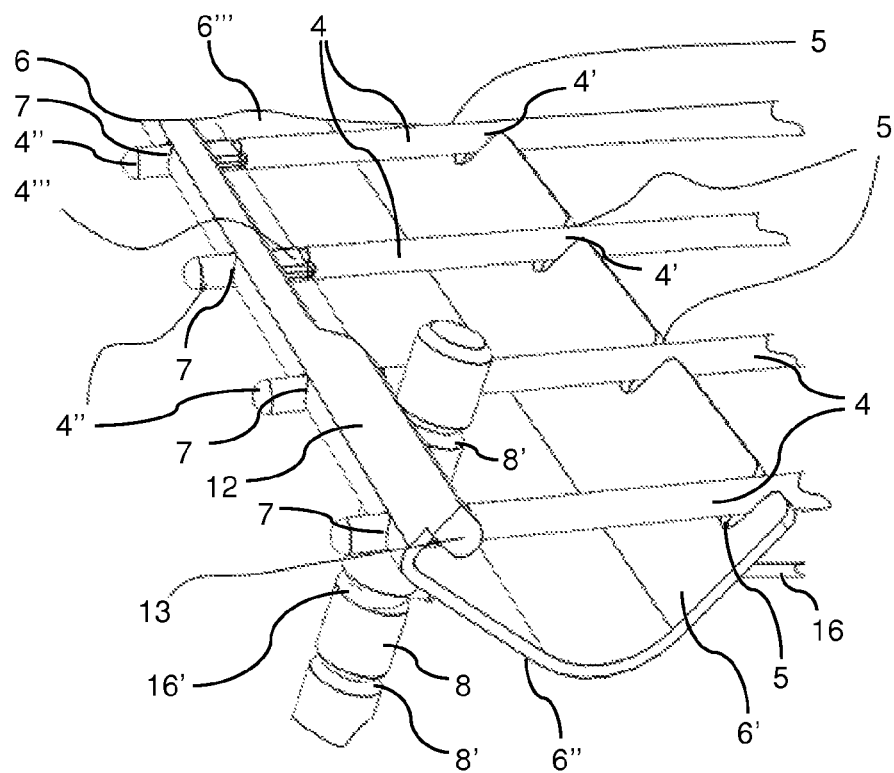
FIG. 4 is a partial perspective view of a front left portion of the portable grill of FIG. 1.
Figure 6C:
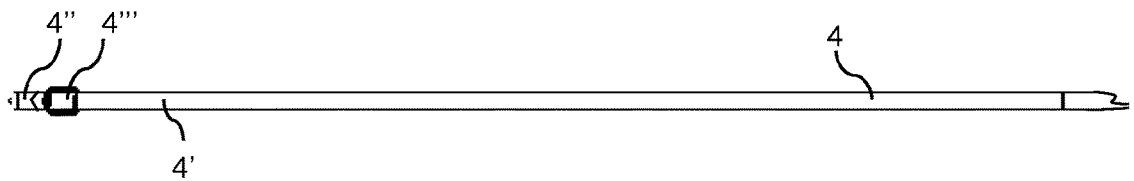
FIG. 6c is a partial side elevation view of a grill bar for some embodiments of the present disclosure, showing a section break in the grill bar about which the grill bar can be disconnected into two sections for stowing/transportation purposes.

Referring to FIGS. 4 & 5, in some embodiments, the grill bars 4 can be connected to the frame members 6, in part, by removably retaining inner end portions 4' of the grill bars 4 in corresponding notches 5 formed on upper edges of the inner sidewalls 6' of the frame members 6. Also, tip portions 4'', or outer end portions, of the grill bars 4 can be inserted through corresponding retaining holes 7 formed on the outer sidewalls 6'' of the frame members 6. Referring to FIGS. 4, 5 and 6c, stop sections 4''' on the grill bars 4, comprising a section of the grill bars 4 having wider diameter than the retaining holes 7, can be formed immediately inward of the tip portions 4'', but outward of the inner end portions 4', on both ends of each grill bar 4, to prevent the grill bars 4 from further insertion through the retaining holes 7 past the stop sections 4'''. In some embodiments, the grill bars 4 are constructed of stainless steel by extrusion process, and then formed (e.g., the stop sections can be formed onto the bars after extrusion).

Referring to FIG. 2, a longitudinal distance between the stop sections 4''' at opposite end portions of each grill bar 4 in its respective non-tensioned state, can be shorter than a distance between the corresponding retaining holes 7 on opposite frame members 6, when the frame members are placed at the maximum distance in the fully assembled state (See., e.g., FIG. 1) under restriction of the tension bars 16. Thus, the grill bars 4 can be compressed, or bent (e.g., bent upward in the middle portions thereof), when connected to the frame members 6 in the fully assembled state, placing the grill bars 4 under tension in order to connect the grill bars 4 to the frame members 6 in the fully assembled state. The grill bars can thus be made of flexible stainless steel with resilient spring characteristics so that they can be bent when assembled into the grill under tension, and then return to original configuration when unloaded, as will be appreciate by those skilled in the art after reviewing this disclosure. In some embodiments, the grill bars 4 can include a section break near a middle portion thereof, so that the grill bars 4 can each be easily disassembled into two separate sections, and easily re-assembled (as discussed further below). In other embodiments, the grill bars 4 can be disassembled into more than two sections, such as, for example, three sections, with a middle section not having a tip portion 4''. In further embodiments, each of the other elongated components (e.g., the leg members, or tension bar) can also be disassembled into more than one section, as will be appreciated by those skilled in the art after reviewing this disclosure.

Referring to FIG. 6a, in some embodiments, the tension bars 16 can be fabricated from spring steel. Also, in some embodiments, the hooked end portions 16' have a partial ring like configuration that can mate snugly with a partial circumferential perimeter of a groove 8' of a leg member 8, to wrap about more than half of a cross-sectional circumference of the groove 8'. That is, for example, the hooked end portions 16' can snap fit around the groove 8' snugly to couple the hooked end portion 16' to the groove 8' under a spring tension of the hooked end portion 16', such that manual force is required to pull the leg member 8 away from the hooked portion 16'. As can be seen in FIG. 6a, the hooked end portions 16' terminate in an outwardly curving bend 16'', to allow a smooth inside wall of the hooked end portions 16' to slide over a surface of a groove 8' to snap fit about the groove 8' and snuggly couple with the groove.

Referring to FIGS. 1-6c, in some embodiments, to place the portable grill 2 in the fully assembled state, a user manually attaches or hooks a hooked end portion 16' of a tension bar 16 to a leg member 8, and an opposite hooked end portion 16' to an opposite leg member 8. The leg members 8 can then be held in upright position, such as, holding one leg member 8 upright, and then a top portion of that leg member 8 can be inserted into a corresponding support aperture 14 on a frame member 6. The same step can then be taken for the opposite leg member 8, with respect to an opposite frame member 6, such that only one end of each of the pair of frame members 6 is supported by a corresponding leg member 8. As described above, with the leg members 8 inserted through the support apertures 14, extending upwardly past the upper edge section of the flanges 12 of the frame members 6, so as to rest a circumferential groove 8' against the thin upper edge sections 12''', the leg members 8 and tension bar 16 will support an end of the frame members 6 on standing leg members 8. The user can then install the leg members 8 onto the other ends of the pair of frame members 6 in similar fashion, using the tension bars 16, resulting in the pair of frame members 6 being supported on each opposite end thereof, using the four leg members 8. Thereafter, with the frame members 6 and leg members 8 disposed in standing configuration, the user can install the grill bars 4, one at a time, or simultaneously with multiple people assisting, placing each grill bar 4 under tension as described above. The tip potions of the grill bars 4 can be inserted into corresponding holes 7, with the notches 5 (within which the inner end portions rest) guiding the grill bars 4 so that the grill bars 4 are retained in an upwardly bent fashion. In some embodiments, tension placed by the leg members 8 on the frame members 6, as the grill bars 4 are installed, and when the portable grill 2 is in the fully assembly state, include laterally inward tension placed on the inner wall 14' of the support apertures 14 where the leg members 8 abut the support aperture, and laterally outward tension placed on the flanges 12 where the leg members abut the thin upper edge section 12''' (in other embodiments, the thin upper edge section 12''' can be omitted and the leg members 8 can just above the upper edge 12' of the flanges 12).

Referring to FIGS. 1 & 2, in some embodiments, the notches 5 and retaining holes 7 can be disposed along the frame members 6 such that longitudinal spacing between the notches and holes 7 is not equidistance throughout the entire length of the frame members 6. For example, as can be seen in FIG. 2, in some embodiments, the spacing between some of the notches/retaining holes at a middle portion 9 of the portable grill 2 is less than spacing between the notches/retaining holes at outward end portions 11 of the grill 2. This variance in spacing can provide for tighter spacing between grill bars in some areas of the grill surface, which can be used to grill small or thinner items (e.g., "hot dogs" or sausages), to prevent those items from falling through gaps between the grill bars 4. In some embodiments, the tighter spacing between grill bars 4 can be positioned at other areas on the grill surface, such as on an outward end portion of the grill surface, or on both outward end portions of the grill surface. For example, in some embodiments, a total of eighteen (18) grill bars 4 are provided, with the tighter spacing between the grill bars 4 starting with the $6^{th}$ grill bar (counting inward from either outer end of the grill). In other embodiments, the tighter spacing can begin and/or terminate at different grill bars, or can be a more gradual change in spacing, wherein, spacing is progressively smaller between grill bars, moving along a surface of the portable grill, and/or progressively wider, or both at different locations of the grill surface. As will be appreciated by those skilled in the art after reviewing this disclosure, the variable spacing provides various benefits, including flexibility in limiting the number of grill bars 4 necessary to lighten the entire portable grill 2 assembly in stowed form.

Figure 7A:
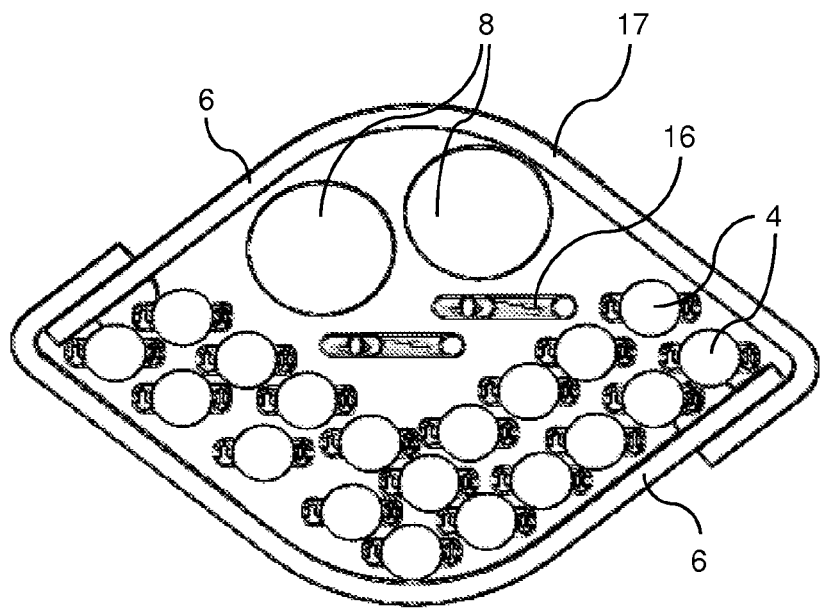
FIG. 7a is a front cross sectional elevation view of a container formed by frame members for the portable grill of some embodiments of the present disclosure, having component parts of the portable grill assembly, including grill bars, tension bars, and leg members, fully disposed therein.
Figure 7B:
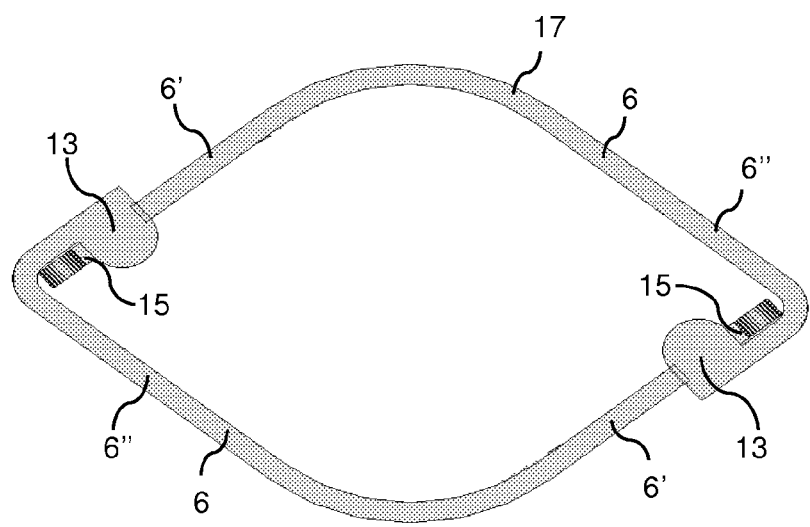
FIG. 7b is a front elevation view of the container of FIG. 7a, without component parts disposed therein, and without end caps placed on the container.
Figure 8:
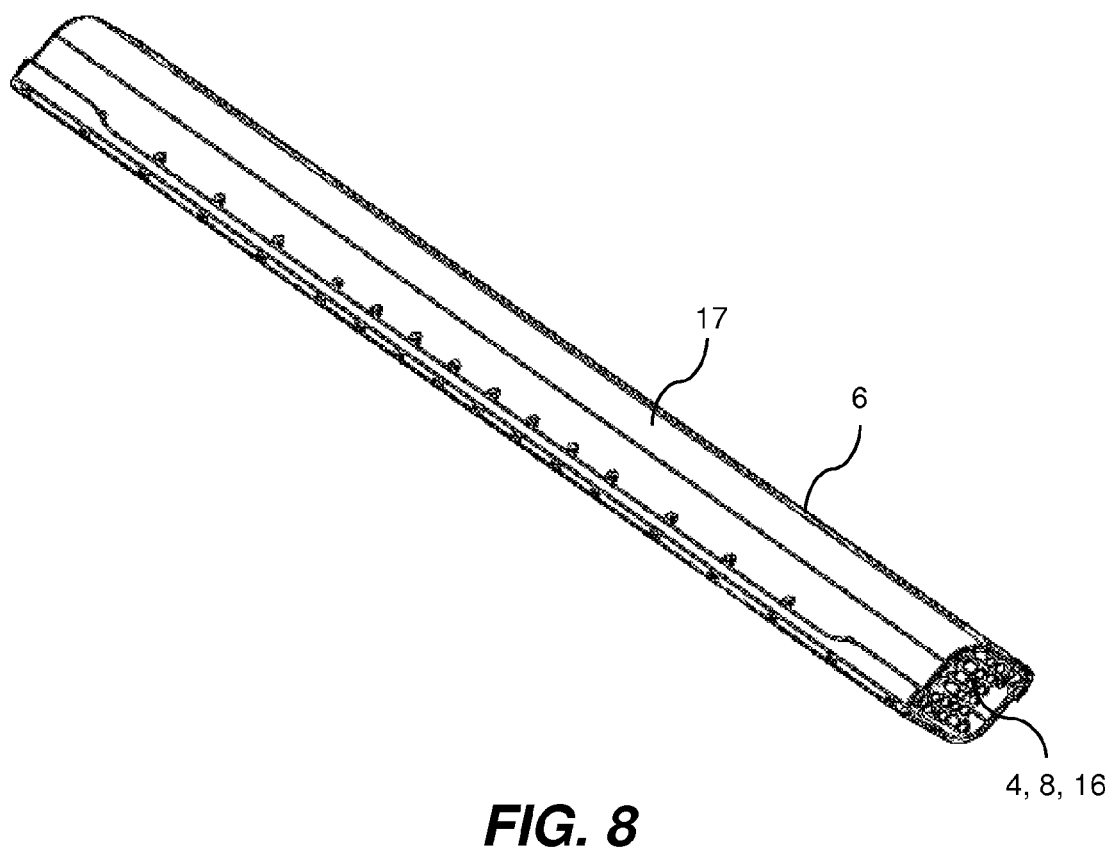

In some embodiments, the portable grill can be disassembled and stowed in compact form as shown in FIG. 9. For example, referring to FIGS. 7a and 7b, the frame members 6 can be mated to provide a container 17 for holding the grill bars 4, tension bars 16 and leg members 8. The frame members 6 can be mated and couple together to form a container 17 by orienting them so that inner faces of the sidewalls 6', 6'' of the respective frame members 6 face one another, then the edges of the sidewalls 6', 6'' can be aligned and brought together. Each of the frame members can have a tab member 13 formed on each respective longitudinal end portion of its flange 12. Also, in some embodiments, each of the frame members 6 can also have a corresponding receiving notch 15, formed on each respect longitudinal end portion of its inside wall 6', for receiving a corresponding tab member 13 of the opposite frame member. When the frame members 6 are aligned and mated together, the tab members 13 can snap fit over the ends of the opposite frame members 6, or into a notch 15 of the opposite frame member 6, to help couple the frame members together, as will be appreciated by those skilled in the art after reviewing this disclosure. Referring to FIGS. 7a & 8, the grill bars 4, tension bars 16, and leg members 8 can be inserted axially into the container 17 for stowing and transportation purposes. In some embodiments, the grill bars are separable into two sections before insertion into the container 17, as described further below.

Referring to FIG. 6c, in some embodiments, the grill bars 4 can each be provided in two opposite elongated sections, with a section break 3 in between. In some embodiments, one section is provided with a threaded interior chamber (opposite its corresponding tip portion 4''') and the other section is provided with a threaded male portion (opposite its corresponding tip portion) for insertion into the threaded interior chamber of the one section, which can then be twisted to fasten the two sections together. In other embodiments, the two sections are generally tubular and the facing end portions are relatively sized so that the facing end portions to be joined can be concentrically pressure fit together using manual force, and can be manually disconnected by being pulled apart, as will be appreciated by those skilled in the art after reviewing this disclosure.

Figure 10A:
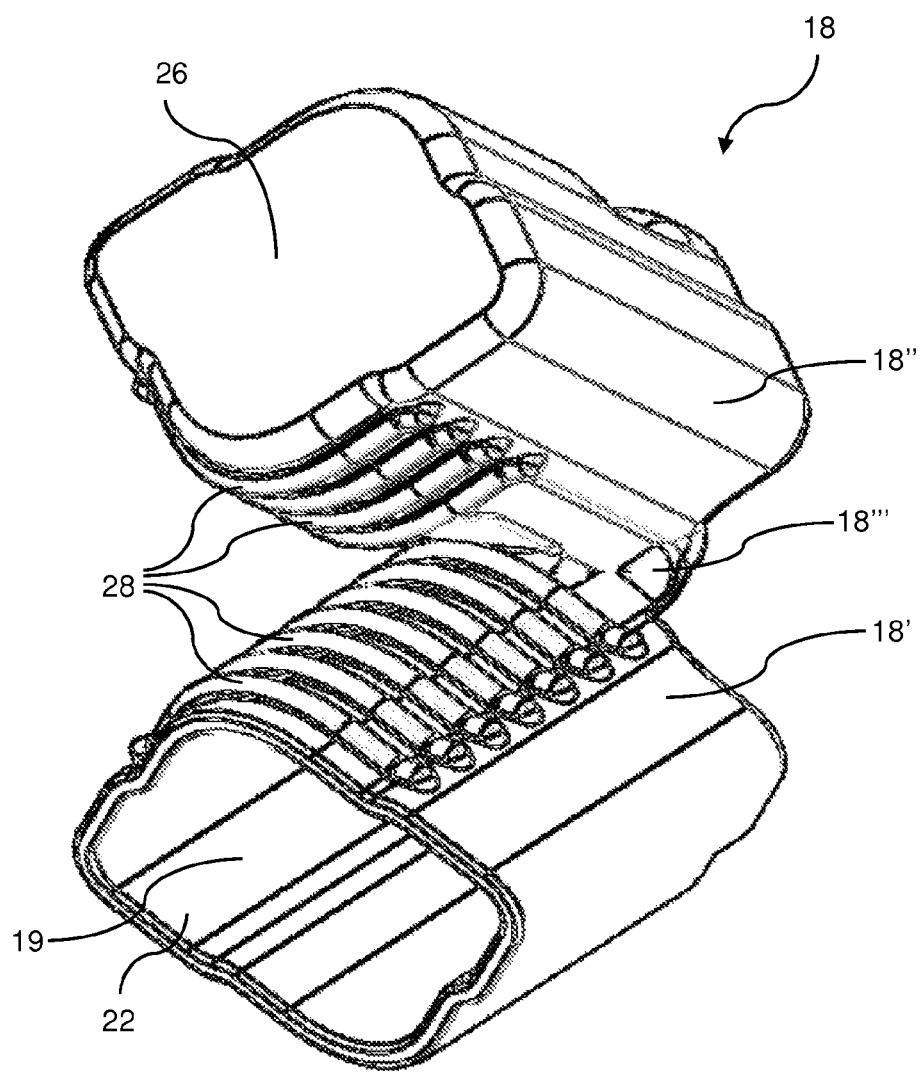
FIG. 10a is a perspective view of an end cap, two of which are shown in FIG. 9, with the end cap sections being pivoted toward one another about a bridge portion thereof, for some embodiments of the present disclosure.
Figure 10B:
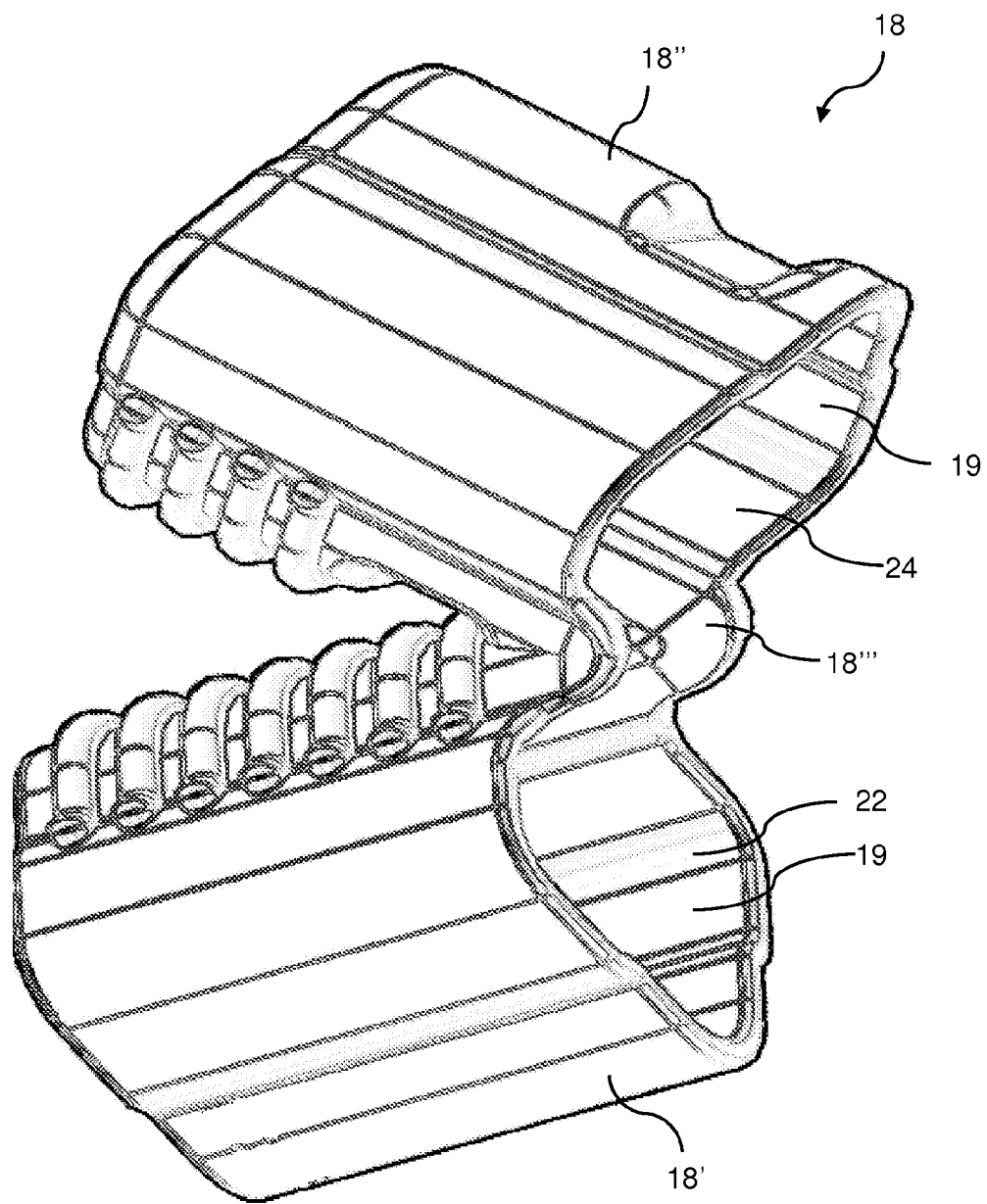
FIG. 10b is a perspective view of the end cap of FIG. 10b, revealing an opposite side of the end cap.
Figure 10C:
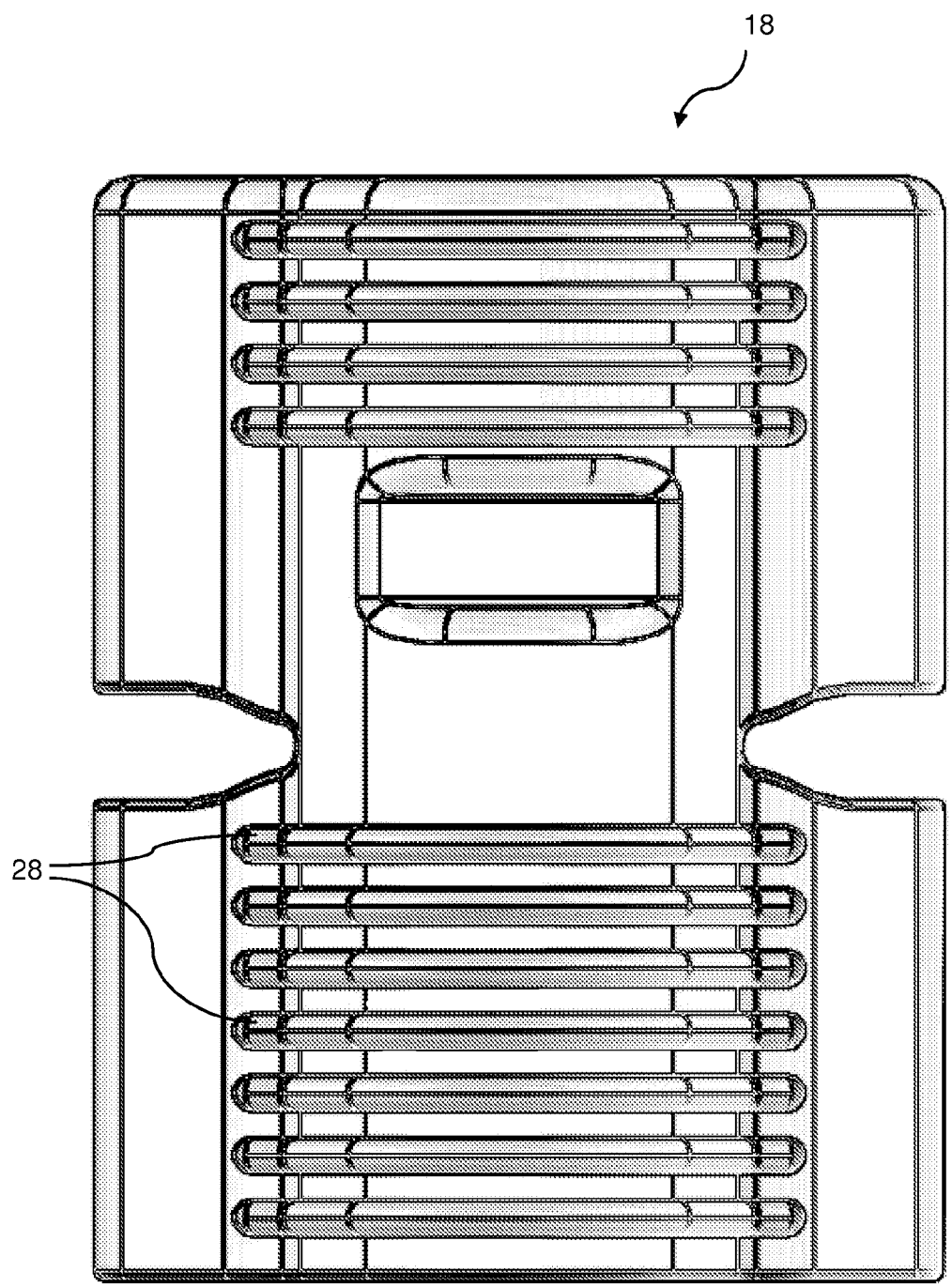
FIG. 10c is an overhead plan view of the end cap of FIG. 10a, with the end cap sections linearly aligned as shown in FIG. 9.
Figure 10D:
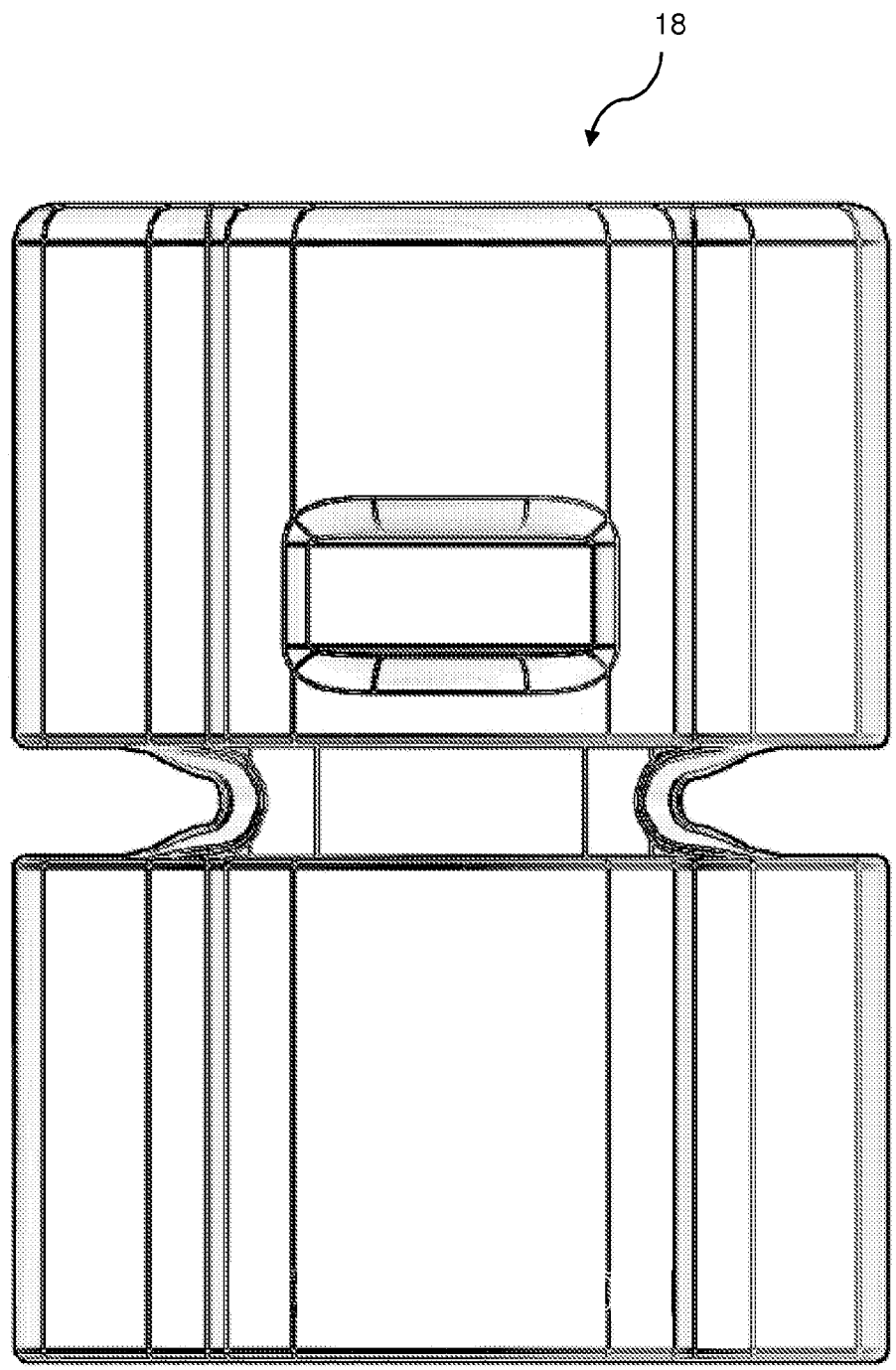
FIG. 10d is a bottom plan view of the end cap of FIG. 10c.

Referring to FIGS. 9-10d, a pair of end caps 18 can be provided to snugly fit over open-ended end portions of the container 17 formed from the frame members 6, to place the portable grill 2 in its fully compact state 20. The end portions of the container 17 can fit into internal chambers 19 of the end caps 18 to help couple the respective frame members 6 together in stowed form.

In addition, the end caps 18 can comprise ANSI silicone and can also be used as cooking mitts. Referring to FIGS. 10a-10d, each end cap 18 can comprise at least two connected sections, namely, a pass-through section 18', having two opposite open ends 22, through which an end portion of the container 17 can pass, and an end section 18'', having an opening 24, into which an end of the container 17 can be inserted, and a closed end wall 26, against which the end of container 17 can abut. The two sections 18', 18'', can be joined together with a bridge portion 18'''. A lateral cross sectional shape of each of the end cap section can approximate the outside surface of the container 17, in order to snuggly fit over the container 17 surface, when an end of the container 17 surface is inserted through the pass-through section 18' and into the end section 18'' of the end cap 18. The pass-through section 18' and end section 18'' of the end caps 18 are linearly aligned when fitted on the container 17 ends so as to allow the entire end cap 18 to be removably snuggly coupled to the container 17 end.

Referring to FIGS. 10a and 10b, when the end caps 18 are removed, the pass-through section 18' and end section 18'' can be pivoted toward one another about the bridge portion 18''', to expose adjacent openings 22 and 24 into both the pass-through section 18' and end section 18'', so that a user can insert fingers into the respective sections (e.g., fingers into one section and thumb into the other adjacent section), to use each end cap 18 as a heat mitt. The end caps can also have a plurality of raised ribs 28 formed on one side of each of the pass-through section 18' and end section 18'', which can provide for further insulation and can also provide a gripping surface when a user uses the end caps 18 to grip hot items (e.g., grill bars, pots, pans, cooking utensils, food, etc). In some embodiments, the bridge portion 18''' is a narrow strip relative to the circumference of the end cap 18, so as to allow the end cap portions to be pivoted around the bridge 18'''.

In addition, or alternatively, to the assembly steps described above, in some embodiments, during assembly, a user, alone, or with the help of other users, can first assemble the leg members 8 into the respective frame members 6, and snap fit or otherwise attach the tension bars 16, which can be sufficient to place the frame members 6 and leg members 8 in standing position ready to receive the grill bars 4. The grill bars 4 can then be inserted under tension into the respective notches and retaining holes. In other embodiments, a user(s), could also attach the leg members 8, then grill bars 4, to the frame members 6, and then apply the tension bars last.

In some embodiments, during disassembly, for stowing, a user can remove tension bars 16 first, which can require manually forcing the leg portions 8 inward, after which, tension is released from the grill bars 4 and they can easily be removed or fall from the frame members 6. Alternatively, the user can remove the grill bars 4 individually before release the tension bars 16. Thereafter, a user can attach the frame members 6 together as described above to form the container 17, and attach one of the end caps 18 to one end of the container, then insert the grill bars 4, tension bars 16, and leg members 8 through the opposite open end of the container. Finally, the user can cover the opposite end of the container with the second end cap 18, to place the portable grill assembly in the fully compact stowed state 20 (See, e.g., FIG. 8).

Figure 11:
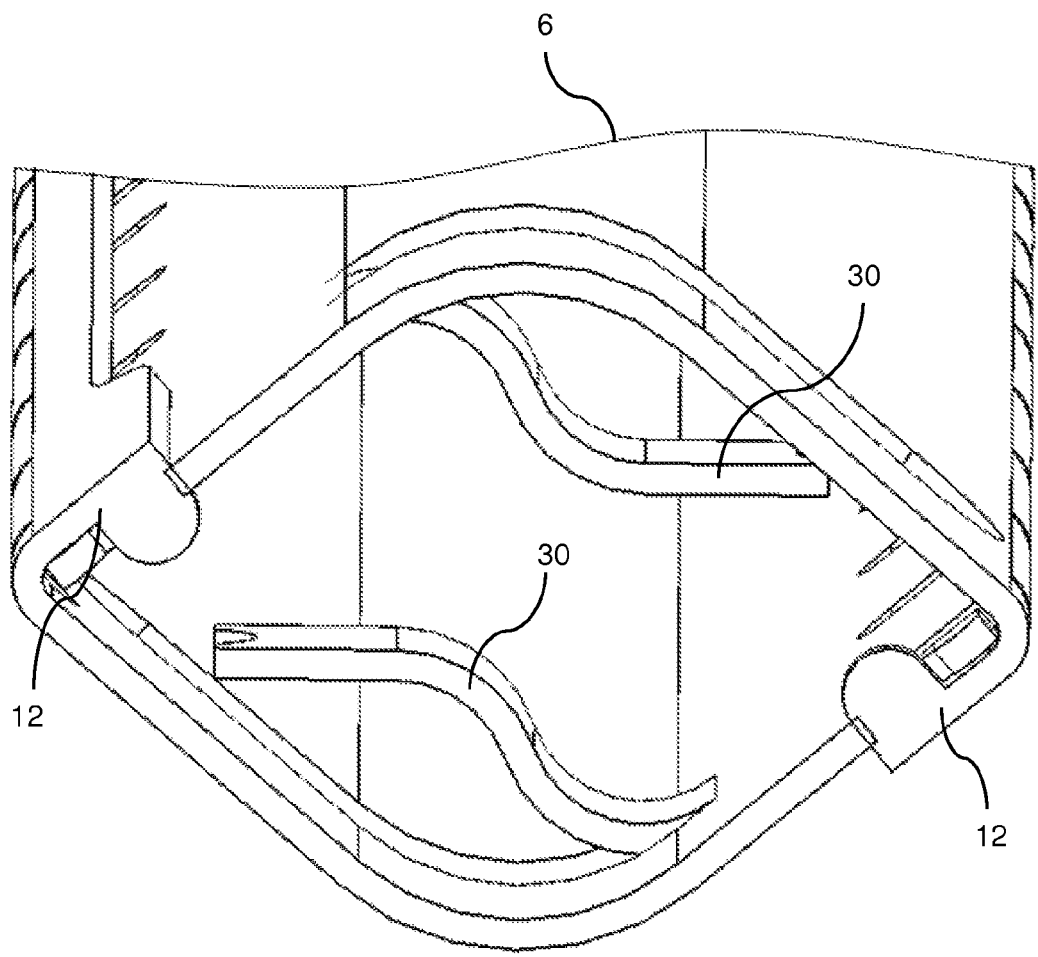
FIG. 11 is a perspective of a front end portion of an alternative embodiment of the container formed from alternative embodiments of the frame members.

Referring to FIG. 11, in some alternative embodiments of the present disclosure, the aperture for leg insertion on the frame members can comprise a supporting strip 20 that protrudes inward and can be braced against a groove 8' of the leg member 8, opposite of the flange 12, to assist in supporting the leg member 8 in the slopped configuration (as described above), as will be appreciate by those skilled in the art after reviewing this disclosure.

In some embodiments, the materials of construction and/or manufacturing methods for various parts can correspond to the following list:
Frame members 6—stainless steel, stamped and formed
Grill bars 4—stainless steel, extruded & formed
Tension bars 16—spring steel
Leg members 8—aluminum, extruded & machined
End caps 18—ANSI silicone Various embodiments in this disclosure are described in the context of use with outdoor grills. However, as will be understood by those skilled in the art after reviewing this disclosure, the embodiments may be suitable for use in other environments, and may be modified in the spirit of this disclosure to accommodate those environments.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A portable grill comprising:
    at least a pair of frame members;
    a plurality of flexible grill bars configured to be removably attached to the frame members under a tensioned state with a spring characteristic of the grill bars imposing a force on the frame members;
    a plurality of leg members configured to be removably attached to the frame members; and
    at least one tension bar configured to be removably attached to at least two of the leg members, wherein a force imposed by the grill bars in the tensioned state acts on the tension bar through the frame members and through the two leg members to which the tension bar is attached, to impose a stretching force on the at least one tension bar; and
    wherein grill bars are configured to be removably attached to the frame members by a tip portion provided on each end of each of the grill bars to be retained within a corresponding receiving hole on one of the pair of frame members and wherein an inner end portion that is inward of the tip portion on each of the grill bars is disposed within a corresponding notch in the tensioned state and the corresponding notch recedes inward from an upper edge perimeter of at least one of the pair of frame members.

2. The portable grill of claim 1 wherein the grill bars are upwardly bent under the tensioned state.

3. The portable grill of claim 1 where at least one of the frame members has a trough like shape.

4. The portable grill of claim 3 where the at least one of the frame members has at least one flange formed above a sidewall of the frame member, the at least one flange extending laterally inward toward a laterally central portion of the frame member.

5. The portable grill of claim 4 wherein in the tensioned state at least one of the leg members exerts a tension against the least one flange as a function of the force imposed by the grill bars on the frame members.

6. The portable grill of claim 1 wherein each leg member has a plurality of circumferential grooves disposed in longitudinally spaced apart fashion along a length of the leg member; and
    wherein at least one of the frame members comprises a flange extending laterally inward toward a central portion of the at least one of the frame members atop a sidewall of the frame member, and wherein in the tensioned state at least one of the leg members abuts the flange within at least one of the circumferential grooves of the leg member, and is forced against the flange by a force imposed as a function of the tensioned state of the grill bars.

7. A portable grill assembly comprising:
    a plurality of elongated leg members;
    a plurality of flexible elongated grill bars, each having a pair of opposite tip portions;
    at least a pair of elongated frame members, each elongated frame member having a trough-like configuration and being configured to be selectively coupled with the other elongated frame member to form a container for storing parts of the portable grill assembly, and each elongated frame member having a plurality of longitudinally spaced apart receiving holes for receiving the tip portions of the grill bars;

at least one elongated tension bar having an attachment member on each opposite end thereof, a distance between the opposite attachment members on the tension bar being configured to impart a tension on the grill bars when opposite tip portions of the grill bars are inserted into the receiving holes and retained therein when the portable grill assembly is placed in a fully assembled state;

at least one end cap configured to removably snuggly fit about an end portion of the container, the end cap having at least one internal chamber and comprised of at least two sections being pivotable about a bridge portion connecting the at least two sections; and wherein a longitudinal spacing between the receiving holes is different between at least some of the receiving holes.

8. The portable grill assembly of claim 7 wherein each of the elongated grill bars, elongated leg members, and elongated tension bar, has a length that is about equal to or less than a length of each of the pair of frame members, or can be manually disassembled into sections that have lengths that are about equal to or less than the length of each of the pair of frame members.

9. The portable grill assembly of claim 7 wherein the frame members each comprise two laterally opposed sidewalls and a laterally central portion, and wherein the receiving holes are formed on a first side wall of each frame member; and further comprising a plurality of notches formed on an edge of a second side wall of each of the frame members, the notches being longitudinally aligned with the receiving holes.

10. The portable grill assembly of claim 7 wherein the frame members each comprise two laterally opposed sidewalls, and wherein at least one of the sidewalls has a flange portion that extends laterally inward toward a laterally central portion of the frame members above the at least one of the sidewalls.

11. The portable grill assembly of claim 7 wherein a first section of the end cap is a pass-through section with two opposite open ends, and wherein a second section of the end cap has one open end, and one closed end.

12. The portable grill assembly of claim 7 wherein a longitudinal spacing between a plurality of receiving holes near a longitudinally middle portion of at least one of the frame members is less than a longitudinal spacing between a plurality of receiving holes near a front end portion of the at least one of the frame members.

13. A method of assembling and using a portable grill, not necessarily limited to the order presented below, the method comprising:

attaching a first end of a tension bar to a first leg member;

attaching a second end of the tension bar to a second leg member;

inserting a portion of the first leg member through an aperture in a first frame member;

inserting a portion of the second leg member through an aperture in a second frame member;

attaching a plurality of grill bars to the frame members under tension by bending the grill bars and attaching tip portions thereof to the frame members;

allowing a spring characteristic of the bent grill bars to impose a force on the tension bar, through a force imposed on the frame members, which is in turn, communicated to the leg members, and in turn, communicated to the tension bar;

abutting the first leg member against a flange of the first frame member situated above the aperture in the first frame member under the force imposed by the grill bars; and grilling a first food item on the grill bars under tension.

14. The method of claim 13 wherein the first leg member abuts against the flange on an outside facing portion of the first leg member facing away from the second leg member.

15. The method of claim 13 further comprising grilling a second food item on the grill bars at a location wherein a spacing between the grill bars is greater than a spacing between the grill bars at a location where the first food item is grilled.

* * * * *